United States Patent
Olster et al.

(10) Patent No.: US 10,516,732 B2
(45) Date of Patent: Dec. 24, 2019

(54) DISCONNECTED INGEST IN A DISTRIBUTED STORAGE SYSTEM

(71) Applicant: DataDirect Networks, Inc., Chatsworth, CA (US)

(72) Inventors: Dan Olster, Oak Park, CA (US); Adam Fried-Gintis, Lake Balboa, CA (US); Donald J. Molaro, Cupertino, CA (US)

(73) Assignee: DataDirect Networks, Inc., Chatsworth, CA (US)

( * ) Notice: Subject to any disclaimer, the term of this patent is extended or adjusted under 35 U.S.C. 154(b) by 386 days.

(21) Appl. No.: 14/270,207

(22) Filed: May 5, 2014

(65) Prior Publication Data

US 2015/0319242 A1 Nov. 5, 2015

(51) Int. Cl.
*H04L 29/08* (2006.01)
*G06F 16/182* (2019.01)
*G06F 16/27* (2019.01)

(52) U.S. Cl.
CPC ...... *H04L 67/1097* (2013.01); *G06F 16/1844* (2019.01); *G06F 16/27* (2019.01)

(58) Field of Classification Search
CPC ............... G06Q 10/10; G06F 17/30011; G06F 21/6227; G06F 17/30067; G06F 17/30286; G06F 17/30575; G06F 17/30212; G06F 11/1446; G06F 11/1456; G06F 16/1844; G06F 16/27; G06F 11/2094; H04L 67/1097
USPC ........................................................ 707/694
See application file for complete search history.

(56) References Cited

U.S. PATENT DOCUMENTS

| | | | | |
|---|---|---|---|---|
| 7,454,437 B1* | 11/2008 | Lavallee | ........... | H04L 29/12594 |
| 8,001,339 B1* | 8/2011 | Holdman | .............. | G06F 3/0607 711/156 |
| 8,099,758 B2* | 1/2012 | Schaefer | ........... | G06F 17/30082 726/1 |
| 8,353,005 B2* | 1/2013 | Kabat | ................. | G06F 21/6218 707/781 |
| 2002/0114341 A1* | 8/2002 | Sutherland | .............. | H04L 41/00 370/428 |
| 2004/0199566 A1* | 10/2004 | Carlson | ............. | G06F 17/30067 709/201 |
| 2007/0156842 A1* | 7/2007 | Vermeulen | ........ | G06F 17/30212 709/217 |
| 2013/0004078 A1* | 1/2013 | Miyazaki | ............. | G06F 21/6218 382/182 |
| 2014/0173235 A1* | 6/2014 | Molaro | ................. | G06F 3/0619 711/162 |

(Continued)

*Primary Examiner* — Michael Pham
(74) *Attorney, Agent, or Firm* — SoCal IP Law Group LLP; Mark Andrew Goldstein (57) ABSTRACT

A data storage system allowing for ingest of data when certain storage is unavailable is described herein. The storage system includes zones that are independent and autonomous from each other. The zones include nodes that are independent and autonomous. The nodes include storage devices. When data is to be stored in the data storage system according to a specified storage policy and the specified storage policy cannot be achieved, the data is stored according to a fallback storage policy. This allows a client to be able to continue executing without having to wait for a storage anomaly to be corrected or pass. After the data is stored according to a fallback storage policy, the data is at a later time stored according to the specified storage policy.

16 Claims, 6 Drawing Sheets

© 2014 DataDirect Networks (56) References Cited

U.S. PATENT DOCUMENTS

2015/0052167 A1* 2/2015 Olster ................ G06F 16/2471
707/769

* cited by examiner

DISCONNECTED INGEST IN A DISTRIBUTED STORAGE SYSTEM

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to data stored in a data storage system and a method for storing data in a data storage system that allows system throughput to be maintained when replication policies cannot immediately be met.

Description of the Related Art

A file system is used to store and organize computer data stored as electronic files. File systems allow files to be found, read, deleted, and otherwise accessed. File systems store files on one or more storage devices. File systems store files on storage media such as hard disk drives and solid-state storage devices.

Various applications may store large numbers of documents, images, audio, videos and other data as objects using a distributed data storage system in which data is replicated and stored in multiple locations for resiliency.

DETAILED DESCRIPTION

Environment

Figure 1:
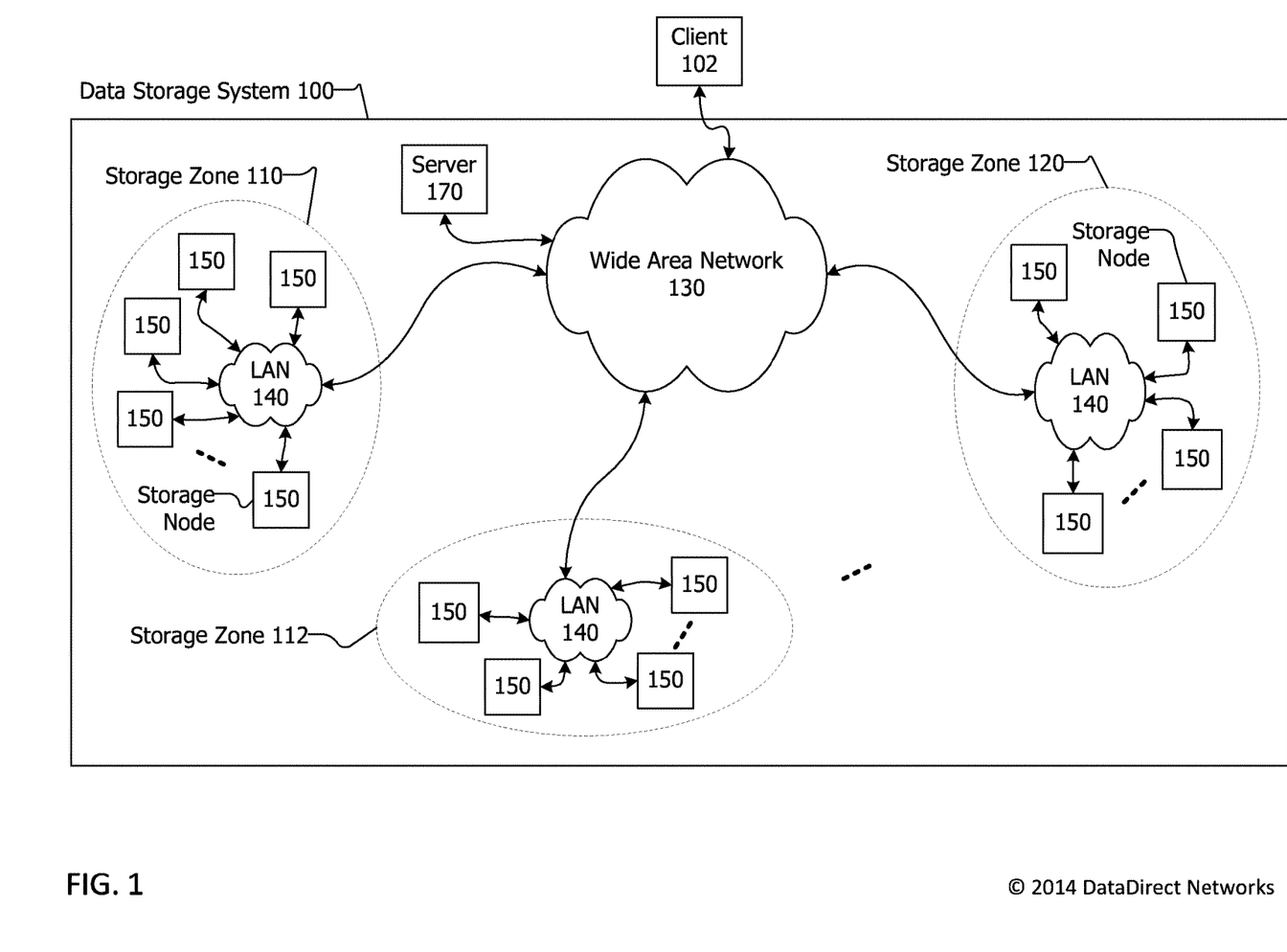
FIG. 1 is a block diagram of a data storage system.

FIG. 1 is a block diagram of a data storage system 100. The data storage system 100 includes at least two storage zones. The data storage system 100 typically includes multiple storage zones that are independent of one another. The storage zones may be autonomous. The storage zones may be in a peer-to-peer configuration. The storage zones may be geographically dispersed. In the example shown, the data storage system 100 includes three storage zones, first storage zone 110, second storage zone 112 and third storage zone 120. In other configurations, more than three storage zones are included in the data storage system. The storage zones may replicate data included in other storage zones. The data storage system 100 may be a distributed replicated data storage system.

The storage zones 110, 112 and 120 may be separated geographically, may be in separate states, may be in separate countries, may be in separate cities, may be in the same location, may be in separate racks, may be in separate buildings on a shared site, may be on separate floors of the same building, and arranged in other configurations. The storage zones 110, 112 and 120 communicate with each other and share objects over wide area network 130. The wide area network 130 may be or include the Internet. The wide area network 130 may be wired, wireless, or a combination of these. The wide area network 130 may be public or private, may be a segregated network, and may be a combination of these. The wide area network 130 includes networking devices such as routers, hubs, switches and the like.

The data storage system 100 may include a server 170 coupled with wide area network 130. The server 170 may augment or enhance the capabilities and functionality of the data storage system by promulgating policies, receiving and distributing search requests, compiling and/or reporting search results, and tuning and maintaining the storage system. The server 170 may include and maintain an object database on a local storage device included in or coupled with the server 170. The object database may be indexed according to the object identifier or OIDs of the objects stored in the data storage system. In various embodiments, the object database may only store a small amount of information for each object or a larger amount of information. Pertinent to this patent is that the object database store policy information for objects. In one embodiment, the object database is an SQLITE® database. In other embodiments, the object database may be a MONGODB®, Voldemort, or other key-value store. The objects and the object database may be referenced by object identifiers or OIDs like those shown and described below regarding FIG. 3.

The term data as used herein includes a bit, byte, word, block, stripe or other unit of information. In one embodiment, the data is stored within and by the distributed replicated data storage system as objects. As used herein, the term data is inclusive of entire computer readable files or portions of a computer readable file. The computer readable file may include or represent text, numbers, data, images, photographs, graphics, audio, video, computer programs, computer source code, computer object code, executable computer code, and/or a combination of these and similar information.

Many data intensive applications store a large quantity of data, these applications include scientific applications, newspaper and magazine websites (for example, nytimes.com and life.com), scientific lab data capturing and analysis programs, video and film creation software, and consumer web based applications such as social networking websites (for example, FACEBOOK®), photo sharing websites (for example, FLIKR), geo-location based and other information services such as NOW from Google Inc. and SRI® from Apple Inc., video sharing websites (for example, YOUTUBE®) and music distribution websites (for example, ITUNES®).

Figure 2:
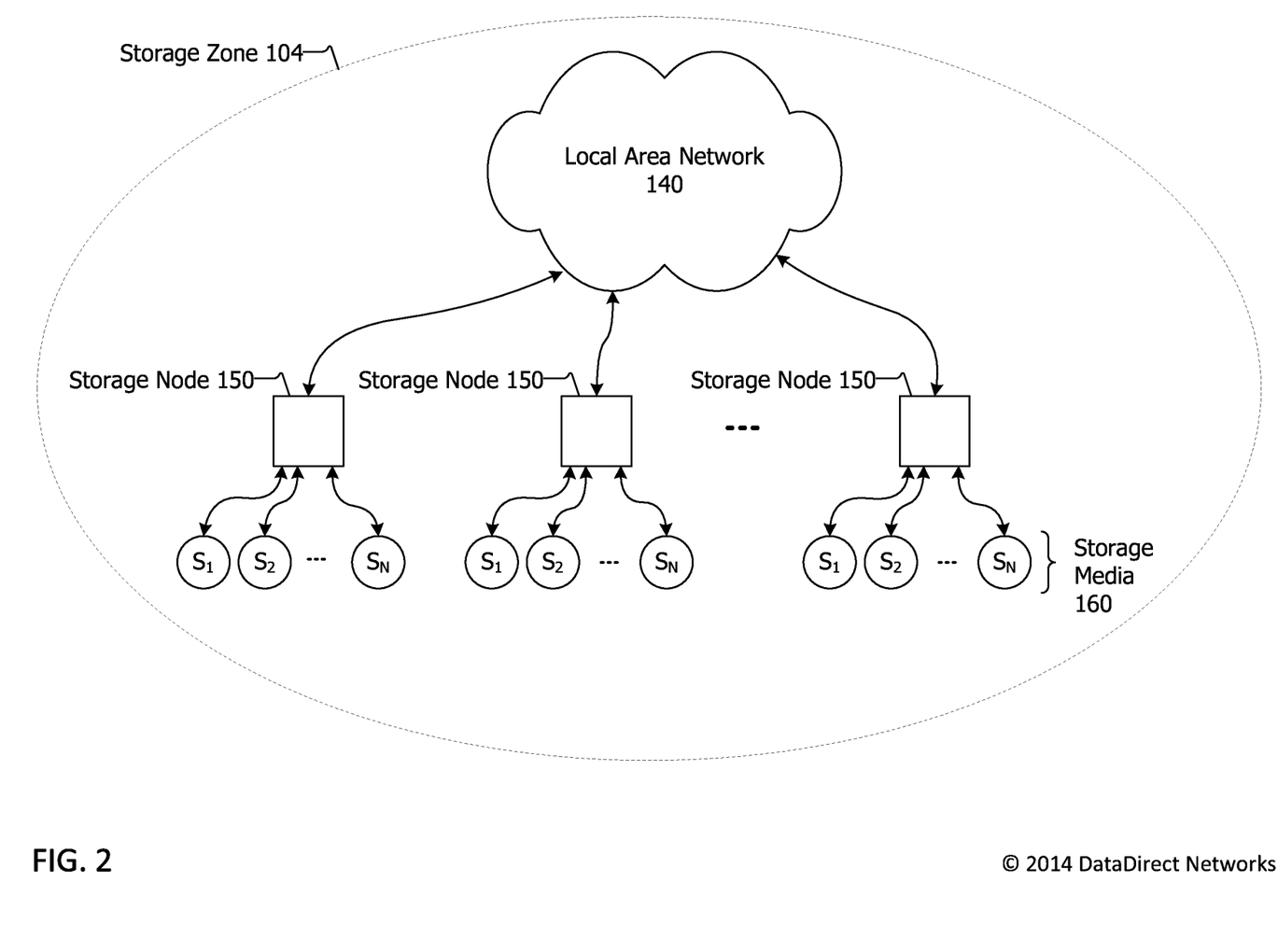
FIG. 2 is a block diagram of a storage zone included in a data storage system.

FIG. 2 is a block diagram of a storage zone 104 included in a data storage system. The storage zones 110 and 120 shown in FIG. 1 are examples of storage zone 104. The storage nodes 150 within a storage zone 104 may be connected via a local area network 140 by wire lines, optical fiber cables, wireless communication connections, and others, and may be a combination of these. The local area network 140 may include one or more networking devices such as routers, hubs, switches and the like.

The storage zones 110, 112, 120 and 104 may include a computing device and/or a controller on which software may execute. The computing device and/or controller may include one or more of logic arrays, memories, analog circuits, digital circuits, software, firmware, and processors such as microprocessors, field programmable gate arrays (FPGAs), application specific integrated circuits (ASICs), programmable logic device (PLDs) and programmable logic array (PLAs). The hardware and firmware components of the computing device and/or controller may include various specialized units, circuits, software and interfaces for providing the functionality and features described herein. The processes, functionality and features described herein may be embodied in whole or in part in software which operates on a controller and/or one or more computing devices in a storage zone, and may be in the form of one or more of firmware, an application program, object code, machine code, an executable file, an applet, a COM object, a dynamic linked library (DLL), a dynamically loaded library (.so), a script, one or more subroutines, or an operating system component or service, and other forms of software. The hardware and software and their functions may be distributed such that some actions are performed by a controller or computing device, and others by other controllers or computing devices within a storage zone. The processes, functionality and features described herein may be embodied in whole or in part in software which operates on a server such as server 170 shown in FIG. 1.

A computing device as used herein refers to any device with a processor, memory and a storage device that may execute instructions such as software including, but not limited to, server computers, personal computers, portable computers, laptop computers, smart phones and tablet computers. Server 170 is, depending on the implementation, a specialized or general purpose computing device. The computing devices may run an operating system, including, for example, versions of the Linux, Unix, MICROSOFT® Windows, Solaris, Symbian, Android, Chrome, and APPLE® Mac OS X operating systems. Computing devices may include a network interface in the form of a card, chip or chip set that allows for communication over a wired and/or wireless network. The network interface may allow for communications according to various protocols and standards, including, for example, versions of Ethernet, INFINIBAND® network, Fibre Channel, and others. A computing device with a network interface is considered network capable.

Referring again to FIG. 2, the storage zone 104 includes a plurality of storage nodes 150 which include a plurality of storage media 160. Each of the storage nodes 150 may include one or more server computers. Each of the storage nodes 150 may be an independent network attached storage (NAS) device or system. The term "storage media" is used herein to refer to any configuration of hard disk drives (HDDs), solid-states drives (SSDs), silicon storage devices, magnetic tape, or other similar storage media. Hard disk drives, solid-states drives and/or other storage media 160 may also be arranged in the storage nodes 150 according to any of a variety of techniques.

The storage media included in a storage node may be of the same capacity, may have the same physical size, and may conform to the same specification, such as, for example, a hard disk drive specification. Example sizes of storage media include, but are not limited to, 2.5" and 3.5". Example hard disk drive capacities include, but are not limited to, 1, 2 3 and 4 terabytes. Example hard disk drive specifications include Serial Attached Small Computer System Interface (SAS), Serial Advanced Technology Attachment (SATA), and others. An example storage node may include 16 three terabyte 3.5" hard disk drives conforming to the SATA standard. In other configurations, the storage nodes 150 may include more and fewer drives, such as, for example, 10, 12, 24 32, 40, 48, 64, etc. In other configurations, the storage media 160 in a storage node 150 may be hard disk drives, silicon storage devices, magnetic tape devices, or a combination of these. In some embodiments, the physical size of the media in a storage node may differ, and/or the hard disk drive or other storage specification of the media in a storage node may not be uniform among all of the storage devices in a storage node 150.

The storage media 160 in a storage node 150 may be included in a single cabinet, rack, shelf or blade. When the storage media in a storage node are included in a single cabinet, rack, shelf or blade, they may be coupled with a backplane. A controller may be included in the cabinet, rack, shelf or blade with the storage devices. The backplane may be coupled with or include the controller. The controller may communicate with and allow for communications with the storage media according to a storage media specification, such as, for example, a hard disk drive specification. The controller may include a processor, volatile memory and non-volatile memory. The controller may be a single computer chip such as an FPGA, ASIC, PLD and PLA. The controller may include or be coupled with a network interface.

In one embodiment, a controller for a node or a designated node, which may be called a primary node, may handle coordination and management of the storage zone. The coordination and management handled by the controller or primary node includes the distribution and promulgation of storage and replication policies. The controller or primary node may communicate with a server, such as server 170, and maintain and provide local system health information to the requesting server.

In another embodiment, multiple storage nodes 150 are included in a single cabinet or rack such that a storage zone may be included in a single cabinet. When in a single cabinet or rack, storage nodes and/or constituent storage media may be coupled with a backplane. A controller may be included in the cabinet with the storage media and/or storage nodes. The backplane may be coupled with the controller. The controller may communicate with and allow for communications with the storage media. The controller may include a processor, volatile memory and non-volatile memory. The controller may be a single computer chip such as an FPGA, ASIC, PLD and PLA.

The rack, shelf or cabinet containing a storage zone may include a communications interface that allows for connection to other storage zones, a computing device and/or to a network. The rack, shelf or cabinet containing a storage node 150 may include a communications interface that allows for connection to other storage nodes, a computing device and/or to a network. The communications interface may allow for the transmission of and receipt of information according to one or more of a variety of wired and wireless standards, including, for example, but not limited to, universal serial bus (USB), IEEE 1394 (also known as FIREWIRE® and I.LINK®), Fibre Channel, Ethernet, WiFi (also known as IEEE 802.11). The backplane or controller in a rack or cabinet containing a storage zone may include a network interface chip, chipset, card or device that allows for communication over a wired and/or wireless network, including Ethernet. The backplane or controller in a rack or cabinet containing one or more storage nodes 150 may include a network interface chip, chipset, card or device that allows for communication over a wired and/or wireless network, including Ethernet. In various embodiments, the storage zone, the storage node, the controller and/or the backplane may provide for and support 1, 2, 4, 8, 12, 16, 32, 48, 64, etc. network connections and may have an equal number of network interfaces to achieve this.

The techniques discussed herein are described with regard to storage media including, but not limited to, hard disk drives and solid-state drives. The techniques may be implemented with other readable and writable optical, magnetic and silicon-based storage media.

As used herein, a storage device is a device that allows for reading from and/or writing to a storage medium. Storage devices include hard disk drives (HDDs), solid-state drives (SSDs), DVD drives, flash memory devices, and others optical, magnetic and silicon-based storage devices. Storage media include magnetic media such as hard disks and tape, flash memory, silicon-based media, and optical disks such as CDs, DVDs and BLU-RAY® discs.

In the data storage system 100, files and other data are stored as objects among multiple storage media 160 in a storage node 150. Files and other data are partitioned into smaller portions referred to as objects. The objects are stored among multiple storage nodes 150 in a storage zone. In one embodiment, each object includes a storage policy identifier and a data portion. The object including its constituent data portion may be stored among storage nodes and storage zones according to the storage policy specified by the storage policy identifier included in the object. Various policies may be maintained and distributed or known to the nodes in all zones in the distributed data storage system. The policies may be stored on and distributed from a client 102 to the data storage system 100 and to all zones in the data storage system and to all nodes in the data storage system. The policies may be stored on and distributed from a server 170 to the data storage system 100 and to all zones in the data storage system and to all nodes in the data storage system.

As used herein, policies specify replication and placement for the object. In other versions of the system, the policies may specify additional features and components. The replication and placement policy defines the replication and placement of data objects in the data storage system. Example replication and placement policies include, full distribution, single copy, single copy to a specific zone, copy to all zones except a specified zone, copy to half of the zones, copy to zones in certain geographic area, copy to all zones except for zones in certain geographic areas, and others. A character (e.g., A, B, C, etc.) or number (0, 1, 2, etc.) or combination of one or more characters and numbers (A1, AAA, A2, BC3, etc.) or other scheme may be associated with and used to identify each of the replication and placement policies. The policy may be stored as a byte or word, where a byte is 8 bits and where a word may be 16, 24, 32, 48, 64, 128, or other number of bits. The policy is included as a policy identifier in an object identifier shown in FIG. 3 as policy identifier 308 in object identifier 300.

Referring again to FIG. 1, the client 102 of the storage system 100 may be a computing device such as, for example, a personal computer, tablet, mobile phone, workstation or server, and may be group of computers or computing nodes arranges as a super computer. The wide area network 130 may connect geographically separated storage zones. Each of the storage zones includes a local area network 140.

The data storage systems described herein may provide for one or multiple kinds of storage replication and data resiliency. The data storage systems described herein may operate as a fully replicated distributed data storage system in which all data is replicated among all storage zones such that all copies of stored data are available from and accessible from all storage zones. This is referred to herein as a fully replicated storage system. Replication may be performed synchronously, that is, completed before the write operation is acknowledged; asynchronously, that is, the replicas may be written before, after or during the write of the first copy; or a combination of each. This configuration provides for a high level of data resiliency.

Another configuration of a data storage system provides for partial replication such that data may be replicated in one or more storage zones in addition to an initial storage zone to provide a limited amount of redundancy such that access to data is possible when a zone goes down or is impaired or unreachable, without the need for full replication. The partial replication configuration does not require that each zone have a full copy of all data objects.

To facilitate the replication of objects in the data storage system, objects with identical policies may be grouped together as object groups. That is, objects having the same replication and placement specification may be grouped together as an object group. These groups represent collections of objects the storage system treats as a unit for the purposes of replication. In some embodiments of the data storage system, the number of objects in an object group may be 16K, 32K, 64K or more. The number of objects in an object group may be fixed, or variable based upon a configuration parameter of the system, or variable based upon the policy. The object database on the server 170 may store information about the group for each object included in the object database. The object identifier 300 described below and shown in FIG. 3 may include a location identifier 302 that further includes both a group identifier ("group ID") and an index as an example way of implementing object groups.

To facilitate the usage of object groups, the data storage system may be configured to store an entire (that is, full, complete) object group on a single storage device. As an object group is typically smaller than the capacity of a storage device, a plurality of object groups, each of which may have different policies, are stored on a storage device. That is, each object group has different replication requirements from other object groups stored on the same storage device.

To allow for efficiently and quickly accessing objects based on object specific information, a local object database may be maintained with each object group. The local object database may be indexed according to the object identifier or OIDs of the objects stored on the storage device. In various embodiments, the local object database may only store a small amount of information for each object or a larger amount of information. Pertinent to this patent is that the object database store policy information for the particular object. In one embodiment the object database may be an SQLITE® database. In other embodiments the database may be a MONGODB®, Voldemort, or other key-value store.

Figure 3:
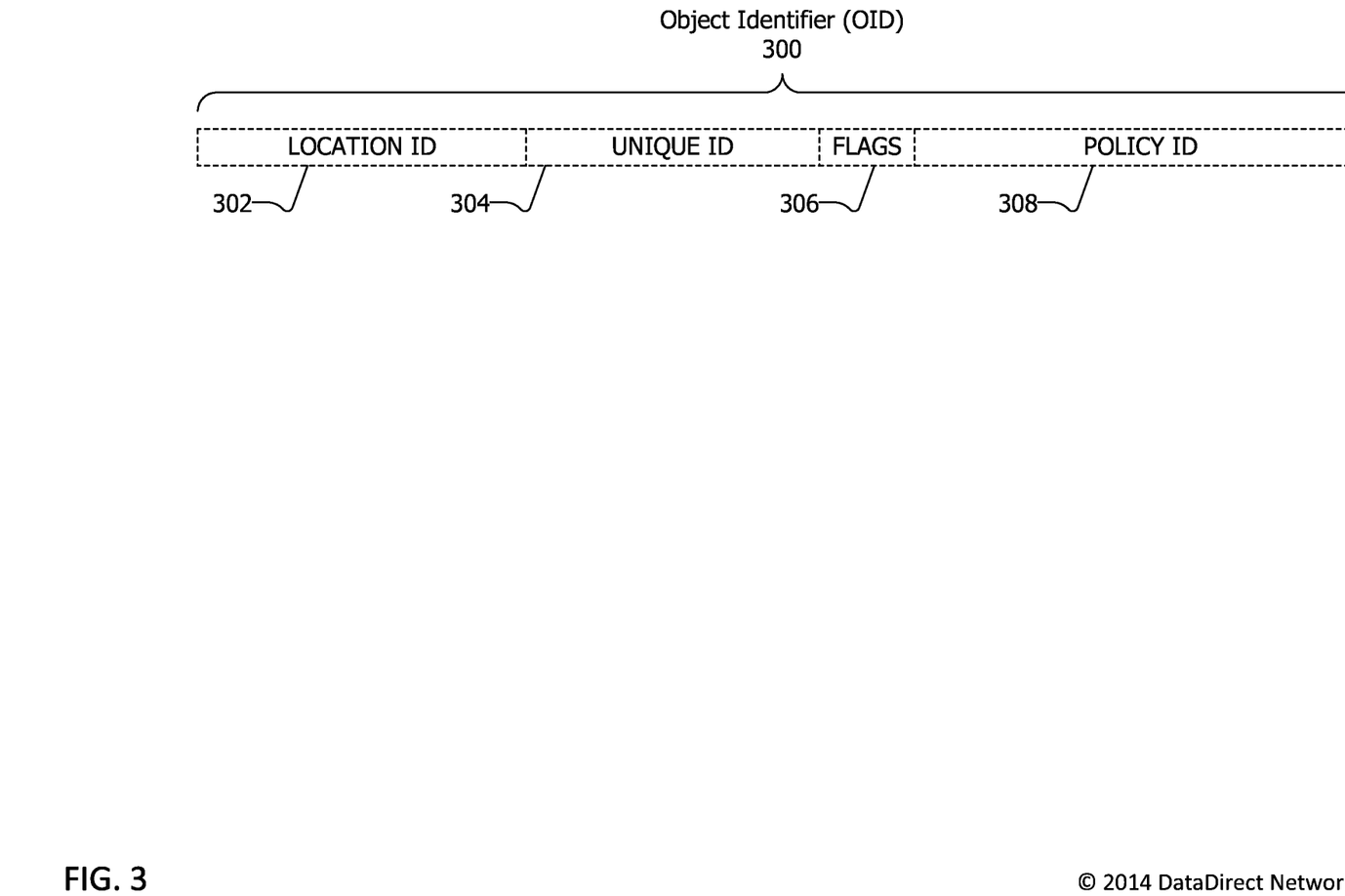
FIG. 3 is a block diagram of an object identifier (OID) for objects stored and managed by the data storage system.

The objects and the object database may be referenced by object identifier or OIDs like those shown and described regarding FIG. 3. Referring now to FIG. 3, a block diagram of an object identifier 300 used in the data storage system is shown. According to the data storage system described herein, an object identifier 300 includes four components and may include three or more components. The object identifier 300 includes a location identifier 302, a unique identifier 304, flags 306 and a policy identifier 308. The object identifier 300 may optionally include flags 306 and other fields. The location identifier 302 specifies a device, address, storage node or nodes where an object resides. The specific format of the location identifier may be system dependent.

In one version of the system, the location identifier 302 is 30 bits, but may be other sizes in other implementations, such as, for example, 24 bits, 32 bits, 48 bits, 64 bits, 128 bits, 256 bits, 512 bits, etc. In one version of the system, the location identifier 302 includes both a group identifier ("group ID") and an index. The group ID may represent a collection of objects stored under the same policy, and having the same searchable metadata fields; the group ID of the object becomes a reference for the embedded database of the object group. The group ID may be used to map the object to a particular storage node or storage device, such as a hard disk drive. The mapping may be stored in a mapping table maintained by the object storage system. The mapping information is distributed and is hierarchical. More specifically, the system stores a portion of mapping information in memory, and the storage nodes hold a portion of the mapping information in their memory. Master copies of the mapping information are kept on disk or other nonvolatile storage medium on the storage nodes. The master copies of the mapping information are dynamically updated to be consistent with any changes made while the system is active. The index may be the specific location of the object within the group. The index may refer to a specific location on disk or other storage device.

The unique identifier 304 is a unique number or alphanumeric sequence that is used to identify the object in the storage system. The unique identifier 304 may be randomly generated, may be the result of a hash function of the object itself (that is, the data or data portion), may be the result of a hash function on the metadata of the object, or may be created using another technique. In one embodiment, the unique identifier is assigned by the controller in such a manner that the storage device is used efficiently. The unique identifier 304 may be stored as 24 bits, 32 bits, 64 bits, 128 bits, 256 bits, 512 bits, 1 kbyte, etc.

The object identifier 300 may optionally include flags 306. Flags 306 may be used to distinguish between different object types by providing additional characteristics or features of the object. The flags may be used by the data storage system to evaluate whether to retrieve or delete objects. In one embodiment, the flags associated with the object indicate if the object is to be preserved for specific periods of time, or to authenticate the client to ensure that there is sufficient permission to access the object. In one version of the system, the flags 306 portion of the OID 300 is 8 bits, but may be other sizes in other implementations, such as, for example, 16 bits, 32 bits, 48 bits, 64 bits, 128 bits, 256 bits, 512 bits, etc.

The policy identifier 308 is described above in para. [0031].

The total size of the object identifier may be, for example, 128 bits, 256 bits, 512 bits, 1 kbyte, 4 kbytes, etc. In one embodiment, the total size of the object identifier includes the sum of the sizes of the location identifier, unique identifier, flags, policy identifier, and version id. In other embodiments, the object identifier includes additional data that is used to obfuscate the true contents of the object identifier. In other embodiments, other kinds and formats of OIDs may be used.

In some embodiments, when the data objects are large, the data object may be partitioned into sub-objects. The flags 308 may be useful in the handling of large data objects and their constituent sub-objects. Similarly, the group ID may be included as part of the location ID 304, and may be used in mapping and reassembling the constituent parts of large data objects.

Processes

Figure 4:
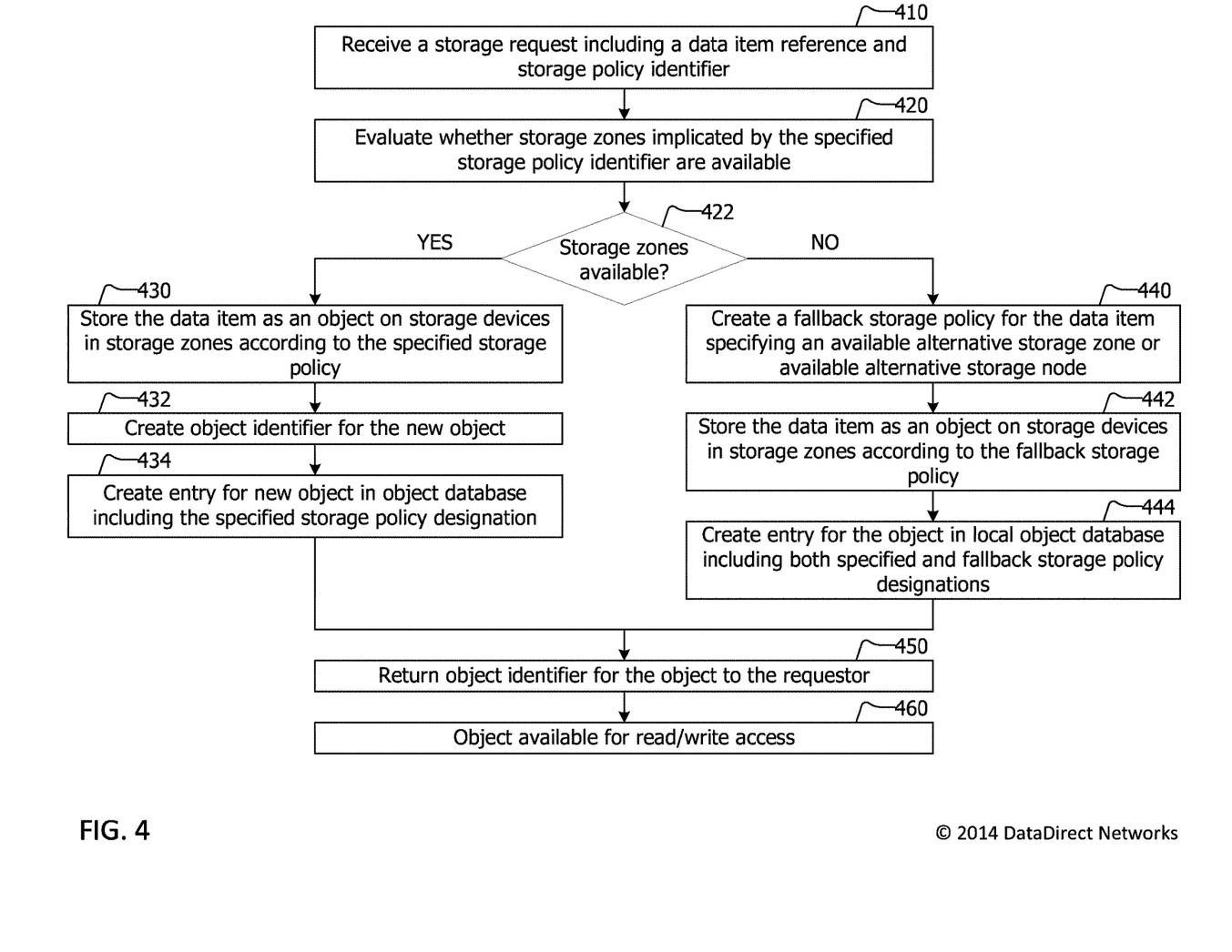
FIG. 4 is a flow chart of the actions taken to store or put data in a data storage system.

Referring now to FIG. 4, a flow chart of the actions taken to store or put data in a data storage system is shown. To store or put a data item, the system receives a storage request that includes a data item reference (or link to a data item) and a storage policy identifier, as shown in block 410. The storage request may be received from a client application running on a client device. The storage policy identifier for the data item may be a code or name. The storage policy may include or represent specific replication and distribution instructions for the referenced data item. The distribution instruction may specify the number of zones in which the data item should be stored, the number of nodes in which the data items should be stored, a specific redundancy scheme identifier, and the like. In another implementation, the specific distribution instructions may be hard coded or system defined or earlier set by a system administrator such that all data items are handled uniformly.

In a typical data storage system, the system would then attempt to store the data item, and would hang if the storage could not be achieved. This could be because a zone is unreachable or otherwise disconnected so that it is unavailable. This could be because certain nodes in zones are full, down or otherwise unavailable. To alleviate this problem of blocking or hanging when waiting for a storage request to be completed, before an attempt to store the data is made as requested, those storage zones implicated by the specified storage policy are evaluated to learn whether they are available, as shown in block 420. Depending on the embodiment, a zone may be unavailable when a communication link to the storage zone is down or the zone is disconnected. However, a storage zone may be considered unavailable in other circumstances that do not amount to a complete inaccessibility or disconnection. That is, when the throughput or data transmission speed to a zone is lower than a particular threshold, when the amount of dropped packets is too high, or other anomalous data communications are occurring, the system may sense or evaluate this and consider the particular zone unavailable.

When all the zones in a specified storage policy are available, as shown in block 422, the system stores the data item as an object on storage devices in storage zones according to the specified storage policy, as shown in block 430. The system creates an object identifier for the new object, as shown in block 432. The system then creates an entry for the new object in the object database of the primary node of a zone in which the object is stored and/or in an object database on a server, as shown in block 434. A server that is part of the data storage system may maintain object location information and object policy information in an object database. The database entries for the object are populated with object specific information about the location of the object in the particular node, zone and/or the data storage system. The kind and content of the database may vary depending on implementation.

In one embodiment, the database entries for objects include an object identifier or OID and the object specific information or metadata include some or all of a user identifier or UID for the author or owner or caretaker of the object, and pertinent time information for the object, including time created and time stored, and may include ATIME, CTIME and MTIME values for the object. Additional object specific fields may also be stored in the object database as metadata regarding the object such as a code or designator or text name for [a] the kind of data represented by the object, including, for example, image, video, audio, text document, and the like, and/or [b] the content of the data, such as, for example, name of person or location or subject, and/or [c] geo-location of where the data was obtained or captured, and/or [d] other information concerning the object. Information for these additional fields may be obtained by extracting existing metadata already included with the object or simple analysis of the object.

After the object is stored (block 430), the object identifier is created (block 432), and the database is updated (block 434), the system returns the object identifier to the requestor, namely the client, as shown in block 450. Returning of the object identifier to the requesting client may occur concurrently with or after object database entries for the object are created. That is, the actions of block 450 may occur before the actions of block 434 or concurrent therewith. The object is then available for read/write access, as shown in block 460.

The local object database may be stored as a database object on the storage medium on which the new object is stored. In this way, redundancy or other similar storage and replication policies applicable to objects in the node and/or zone in which the storage medium exists are applied to the database object such that the resiliency of the database object is ensured.

Returning to block 422, when all the zones in a specified storage policy are not available, the system creates a fallback storage policy for the data item specifying an available alternative storage zone or available alternative storage node, as shown in block 440. That is, when communications to zone are entirely down, when speed is too low, when the number of dropped packets is too high, the zone is considered unavailable, and an alternate zone is used according to a fallback policy. The alternate zone of the fallback policy may be local or remote to a current zone, that is, in a same rack, in a different rack, in a different geographical location, in a same geographical location, etc. The system stores the data item as an object on storage devices in storage zones according to the fallback storage policy, as shown in block 442. The system then creates an entry for the object in a local object database at a priority node, including both the specified storage policy, which has not been met, and fallback storage policy designations, as shown in block 444. Alternatively or additionally, the object database may be maintained by and updated at a server. The system then returns the object identifier to the requesting client, the requestor, as shown in block 450. Returning of the object identifier to the requestor may occur concurrently with or after object database entries for the object are created. That is, the actions of block 450 may occur before the actions of block 434 or concurrent therewith. The object is then available for read/ write access by a client, as shown in block 460. In this way, even though the specified storage policy is not met or achieved, a fallback policy is implemented so that the data storage system continues to function and does not delay, block or otherwise negatively impact a client. Importantly, the client is not notified that the specified storage policy was not met or achieved; to the contrary, providing the object identifier to the requesting client signifies to the client that the storage request successfully completed.

Figure 5:
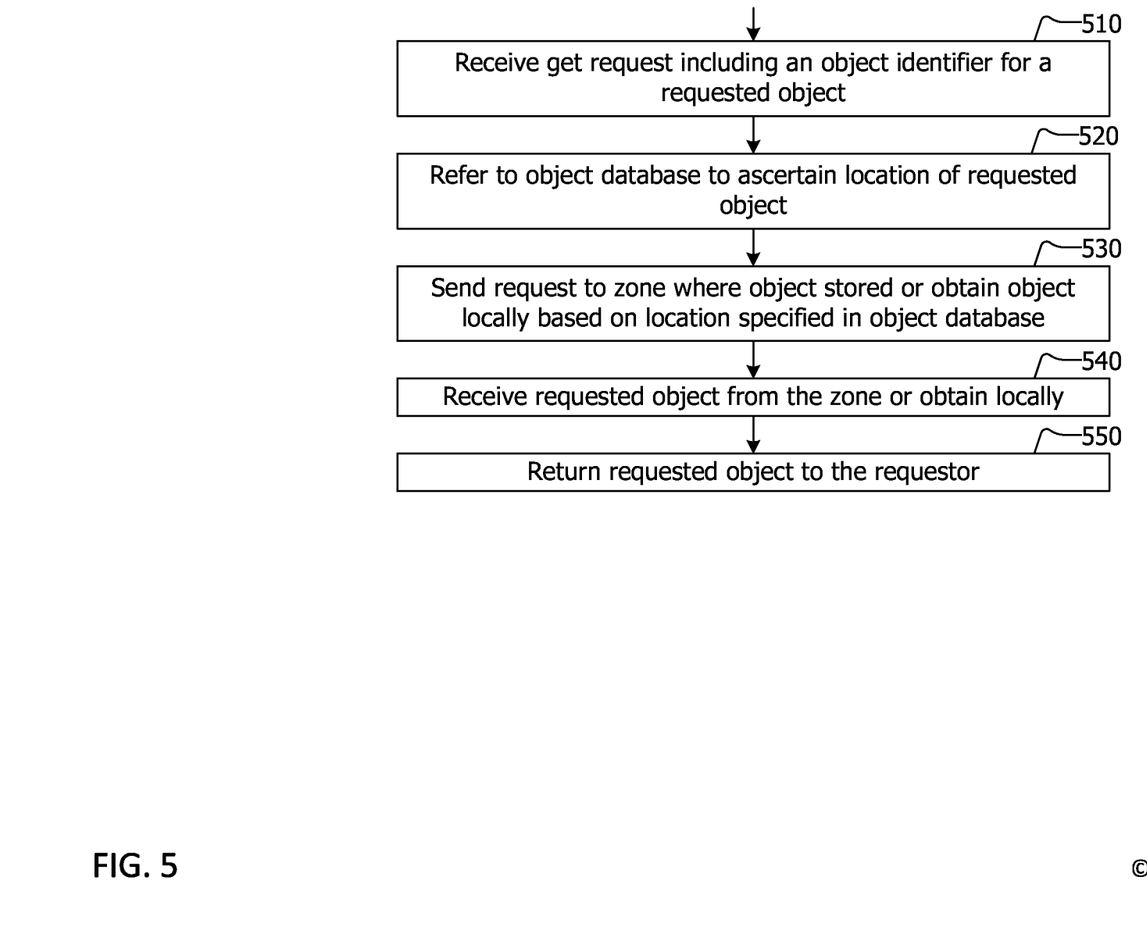
FIG. 5 is a flow chart of the actions taken to read or get data stored in a data storage system.

FIG. 5 is a flow chart of the actions taken to read or get data stored in a data storage system. The system receives a get (or read) request including an object identifier for a requested object, as shown in block 510. The system refers to an object database to ascertain the location of the requested object, as shown in block 520. The object database may be on a server or on a primary node. The system sends the get/read request to a zone where the object is stored, or, if being handled by a primary node, obtains the object locally based on the location specified in database, as shown in block 530. The system receives the requested object or a pointer or reference thereto from the zone or obtains the requested object locally, as shown in block 540. The system returns the requested object or a pointer to the object to the requestor, as shown in block 550. This get/read request can be handled successfully by the system even when the client requestor specified policy for an earlier put/write was not able to be met. That is, because the system used a fallback policy, the system was able to store the data item as an object according to the fallback policy so as not to halt, block or delay access to the data item by the client.

Figure 6:
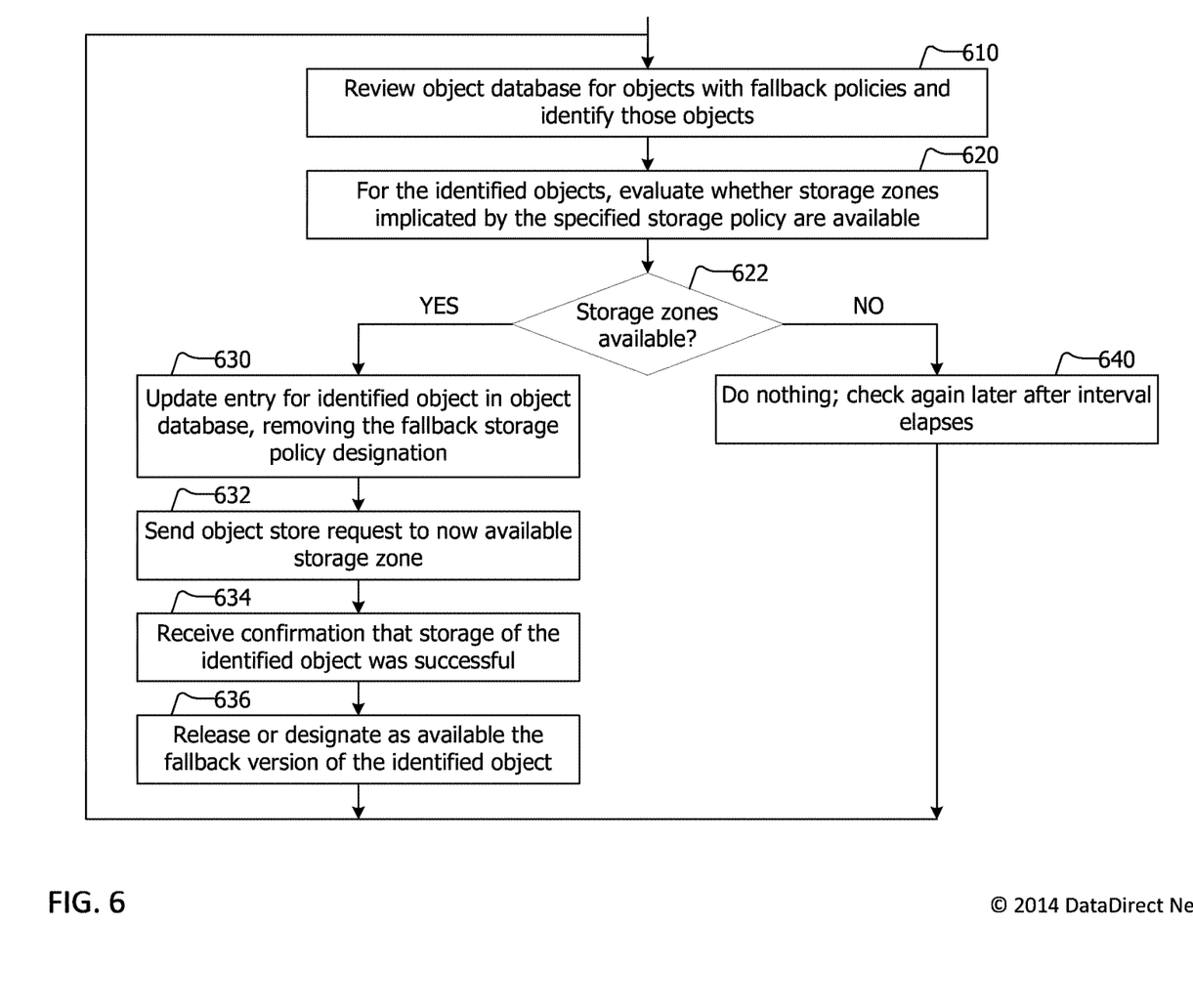
FIG. 6 is a flow chart of the actions taken to reset the storage policies for data stored in a data storage system.

FIG. 6 is a flow chart of the actions taken to reset the storage policies for objects stored in a data storage system. When a fallback policy is used in place of a specified policy, the data storage system stores the data item in one or more temporary auxiliary locations. However, the data storage system eventually, when possible, executes the client specified storage policy so that the replication and resiliency in the specified policy are achieved. The actions taken to evaluate and effectuate a specified policy after a fallback policy has been executed may be attempted regularly at certain time intervals and/or when communications from a down or inaccessible or otherwise unavailable zone are back or meet certain quality and/or performance standards. The interval may be in milliseconds, seconds, tens of seconds or minutes, depending on the implementation.

The system reviews the object database for objects with fallback policies, as shown in block 610. The system may identify these objects and they may be referred to as identified objects. As above, the actions described in FIG. 6 may be performed by a server that is included with the data storage system or may be performed by a primary node in a primary zone in the data storage system. The system evaluates whether storage zones implicated by the specified storage policy are available, as shown in block 620. When the storage zones implicated by the specified policy remain unavailable, as shown in block 622, nothing is done and the system will check again later at a later time according to a specified interval, as shown in block 640. The flow of actions resumes at block 610 where other data objects with a designated fallback policy are evaluated.

When the storage zones for the specified policy are available, as shown in block 622, the system updates the entry for the identified object in the object database, removing the fallback storage policy designation for the identified object, as shown in block 630. The system sends an object store request to now available storage zone(s) for the specified policy for the identified data object, as shown in block 632. Storage requests are only sent to those storage zones that were earlier inaccessible. This may be determined by comparison of the specified policy with the fallback policy, or by a specification in the database entry of the data object of those storage zones that were unreachable or otherwise unavailable earlier. As such, not all zones in the specified policy are contacted. The system receives confirmation of successful storage of the identified object to the storage zone in the specified policy, as shown in block 634. Depending on the configuration and resiliency goals, the system may or may not release or designate as available the storage area where the fallback policy version of the object was located, as shown in block 636. The flow of actions resumes at block 610 where other data objects with a designated fallback policy are evaluated. The flow of actions from blocks 630 through 634 may differ in various embodiments. For example, the actions in block 630 could come after the action in block 634.

The actions taken in FIGS. 4, 5 and 6 may also be applied to groups of objects in an object group. This increases the efficiency of handling the object access requests and object management. To achieve this, the actions shown in FIGS. 4, 5 and 6 are taken upon groups of objects in an object group rather than single objects. In this way, when an object group could not be written according to a specified storage policy, all objects in the object group are stored pursuant to a fallback policy for the group pursuant to the method shown in FIG. 4. And all objects in the object group may be read according to the actions shown in FIG. 5. The system will later store all objects in the object group to meet the requirements of the specified storage policy according to the method shown and described regarding FIG. 6.

CLOSING COMMENTS

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments. That is, the action in block 636 is optional.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

Use of ordinal terms such as "first", "second", "third", etc., "primary", "secondary", "tertiary", etc. in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

It is claimed:

1. A data storage system comprising:
a plurality of storage zones coupled to a network, each storage zone comprising a plurality of nodes wherein each node comprises a plurality of storage devices, a server coupled to the network, the server including a processor, memory and local storage, the local storage having instructions stored thereon which when executed cause the server to perform actions including:
receiving a storage request from a client of the data storage system to store a data item, the storage request including a data item reference and a specified storage policy identifier;
evaluating whether storage zones implicated by the specified storage policy identifier are available, including checking whether communications with the storage zones implicated by the specified storage policy identifier are entirely down, checking whether communications speed with the storage zones implicated by the specified storage policy identifier are below a system defined threshold, checking whether communication with the storage zones implicated by the specified storage policy identifier exceed a system defined threshold of dropped packets;
when all the storage zones implicated by the specified storage policy identifier are not available, creating a fallback storage policy for the data item specifying an available alternative storage zone different from the storage zones implicated by the specified storage policy identifier;
storing the data item as an object on storage devices in at least one storage zone according to the fallback storage policy;
creating an entry for the object in an object database on the server including the specified storage policy identifier and a fallback storage policy identifier signifying the fallback storage policy, the entry for the object having an object identifier;
providing the object identifier for the object to the client.

2. The data storage system of claim 1 wherein the storage devices are hard disk drives and/or solid state storage devices.

3. The data storage system of claim 1 wherein the evaluating includes checking whether a storage zone is accessible and/or whether the data communications to the storage zone meets a specified throughput.

4. The data storage system of claim 1 wherein the specified storage policy identifier includes a replication and placement component specifying replication and placement requirements of the object.

5. The data storage system of claim 1 wherein the storing the data item includes storing the data item as part of an object group of other data items that have the same specified storage policy identifier.

6. The data storage system of claim 1 wherein the local storage of the server has further instructions stored thereon which when executed cause the server to perform further actions including:
receiving a get request including an object identifier of a requested object;
referring to the object database to ascertain the location of the requested object, the location being specified by the fallback storage policy identifier;
sending a read request to the zone where the requested object was stored according to the fallback storage policy identifier to obtain the requested object;
returning the requested object to the client.

7. The data storage system of claim 1 wherein the local storage of the server has further instructions stored thereon which when executed cause the server to perform further actions including:
reviewing the object database for objects with fallback policies and identifying those objects;
for an identified object, evaluating whether storage zones implicated by the specified storage policy identifier are available, including checking whether communications with the storage zones implicated by the specified storage policy identifier are entirely down, checking whether communications speed with the storage zones implicated by the specified storage policy identifier are below the system defined threshold, checking whether communication with the storage zones implicated by the specified storage policy identifier exceed the system defined threshold of dropped packets;

when the storage zones implicated by the specified storage policy identifier are not available, checking again later at a system defined interval;

when at least one of the storage zones implicated by the specified storage policy identifier is available,
  updating the entry for the identified object in the object database including removing the fallback storage policy designation,
  sending an object store request to a now available storage zone for the specified storage policy identifier for the identified data object,
  receiving confirmation that storage of the identified object was successful from the now available storage zone.

8. The data storage system of claim 7 wherein the local storage of the server has further instructions stored thereon which when executed cause the server to perform further actions including:
  when at least one of the storage zones implicated by the specified storage policy identifier is available, releasing a fallback version of the identified object.

9. A method for storing data comprising:
  receiving from a client computing device a storage request to store a data item, the storage request including a data item reference and a specified storage policy identifier;
  evaluating whether storage zones of a plurality of storage zones implicated by the specified storage policy identifier are available, wherein each storage zone includes a plurality of storage nodes and each storage node includes a plurality of storage devices, the evaluating including checking whether communications with the storage zones implicated by the specified storage policy identifier are entirely down, checking whether communications speed with the storage zones implicated by the specified storage policy identifier are below a system defined threshold, checking whether communication with the storage zones implicated by the specified storage policy identifier exceed a system defined threshold of dropped packets;
  when all the storage zones implicated by the specified storage policy identifier are not available, creating a fallback storage policy for the data item specifying an available alternative storage zone different from the storage zones in the specified storage policy identifier;
  storing the data item as an object on storage devices in at least one storage zone according to the fallback storage policy;
  creating an entry for the object in an object database including the specified storage policy identifier and a fallback storage policy identifier signifying the fallback storage policy, the entry for the object having an object identifier;
  providing the object identifier for the object to the client computing device.

10. The method of claim 9 wherein the storage devices are hard disk drives and/or solid state storage devices.

11. The method of claim 9 wherein the evaluating includes checking whether a storage zone is accessible and/or whether the data communications to the storage zone meets a specified throughput.

12. The method of claim 9 wherein the specified storage policy identifier includes a replication and placement component specifying replication and placement requirements of the object.

13. The method of claim 9 wherein the storing the data item includes storing the data item as part of an object group of other data items that have the same specified storage policy identifier.

14. The method of claim 9 further comprising:
  receiving a get request including an object identifier of a requested object;
  referring to the object database to ascertain the location of the requested object, the location being specified by the fallback storage policy identifier;
  sending a read request to the zone where the requested object was stored according to the fallback storage policy identifier to obtain the requested object;
  returning the requested object to the client computing device.

15. The method of claim 9 further comprising:
  reviewing the object database for objects with fallback policies and identifying those objects;
  for an identified object, evaluating whether storage zones implicated by the specified storage policy identifier are available, including checking whether communications with the storage zones implicated by the specified storage policy identifier are entirely down, checking whether communications speed with the storage zones implicated by the specified storage policy identifier are below the system defined threshold, checking whether communication with the storage zones implicated by the specified storage policy identifier exceed the system defined threshold of dropped packets;
  when the storage zones implicated by the specified storage policy identifier are not available, checking again later at a system defined interval;
  when the storage zones implicated by the specified storage policy identifier are available,
    updating the entry for the identified object in the object database including removing the fallback storage policy designation,
    sending an object store request to a now available storage zone for the specified storage policy identifier for the identified data object,
    receiving confirmation that storage of the identified object was successful from the now available storage zone.

16. The method of claim 15 further comprising:
  when at least one of the storage zones implicated by the specified storage policy identifier is available, releasing a fallback version of the identified object.

* * * * *